United States Patent [19]

Kerklaan

[11] Patent Number: 5,529,503

[45] Date of Patent: Jun. 25, 1996

[54] JACKETED CIRCUIT CARD

[75] Inventor: Albert J. Kerklaan, Milton, Canada

[73] Assignee: International Business Machines Corporation, Armonk, N.Y.

[21] Appl. No.: 949,917

[22] Filed: Sep. 24, 1992

[30]  Foreign Application Priority Data

Dec. 9, 1991 [CA] Canada ................................ 2057518

[51] Int. Cl.⁶ ................................................ H01L 23/12
[52] U.S. Cl. .................... 439/76.1; 361/737; 361/686; 361/684; 235/492; 174/65 R
[58] Field of Search ................... 439/76; 361/392, 361/395, 399, 685, 686, 737, 728, 730, 736, 684; 235/487, 492; 174/65 R

[56]  References Cited

U.S. PATENT DOCUMENTS

| | | | |
|---|---|---|---|
| 4,767,348 | 8/1988 | Murakami | 361/399 X |
| 4,893,001 | 1/1990 | Ohkubo et al. | 235/492 X |
| 5,016,086 | 5/1991 | Inoue et al. | 361/395 X |
| 5,061,845 | 10/1991 | Pinnavaia | 361/395 X |

*Primary Examiner*—Timothy V. Eley
*Assistant Examiner*—Khan V. Nguyen
*Attorney, Agent, or Firm*—Daniel E. McConnell

[57]  ABSTRACT

A circuit card has a circuit module including circuit component assembly and an electrical connector attached to the component assembly. A protective metal covering closely girds and substantially encloses the module in a one-piece substantially rigid jacket. An opening in the jacket exposes a portion of the electrical connector for connection to external equipment such as a computer.

1 Claim, 7 Drawing Sheets

JACKETED CIRCUIT CARD

FIELD OF THE INVENTION

This invention relates generally to the mechanical design of removable or portable circuit cards which are designed for both compactness and the protection of the internal components of the circuit cards.

BACKGROUND OF THE INVENTION

In the electronic industry electronic circuits have become more and more compact to the point that small portable circuit cards have been developed that can be removably inserted into electronic equipment typically for temporary use. In particular, external memory circuit cards have been developed which approximate the size of credit cards, though somewhat thicker, and which incorporate a circuit board sandwiched between metal or plastic covers, and an electrical connector for connection to external electronic equipment.

Cartridges enclosing storage devices for programs such as games have been in use for many years particularly for video games and some microcomputers. Because of their relatively large size physical durability was not a property that was difficult to develop for cartridges. Space was available to build the necessary strength into the components and housings. However, for a circuit card package the size of a credit card physical construction techniques are more limited.

Memory card devices are illustrated in U.S. Pat. No. 4,924,076, issued May 8, 1990 and assigned to Mitsubishi Denki Kabusihiki Kaisha, Japan. The devices illustrated incorporate semiconductor devices mounted in an internal base and enclosed in a plastic package formed from two bonded plastic sections.

Another reference, U.S. Pat. No. 4,798,946, issued Jan. 17, 1989, and assigned to the assignee of the previous mentioned patent describes a plastic package for containing an IC card, which essentially constructs a plastic box from halves glued along mating edges.

It does not appear that the devices referred to in the above references would meet the specifications outlined by the Personal Computer Memory Card International Association (PCMCIA), in September 1991, relating to torque, bend, flex and warpage of credit card sized memory cards. Plastic components do not generally provide sufficient electrical shielding to protect internal electronic components from static electricity, while adhesives used to bond them may fail under stress from heat, humidity and other factors.

Similarly, designs known to the applicant incorporating electronic cards retained by plastic perimeter frames and sandwiched between planar plastic or metal sheets bonded to the frame have not been able to meet the PCMCIA specifications.

U.S. Pat. No. 4,386,388 issued May 31, 1983 and assigned to Northern Telecom Limited describes a printed circuit board assembly which uses a sheet aluminum cover which loosely encloses a circuit board; abutting edges of the cover are held in a contiguous relationship by inturned edges of the cover which engage small notches in end plates on the circuit board. While this assembly may be satisfactory for larger circuit boards, sufficient strength or stiffness is not likely possible for circuit boards approaching the size of credit cards.

Card designs which involve bonding card covers to internal circuit components can produce undesirable stresses on the components and their connections with other components reducing durability.

STATEMENT OF THE INVENTION

It has been found that the invention herein overcomes the deficiencies of the prior art while providing a compact circuit card assembly which is convenient from a manufacturing perspective and which is physically durable even if constructed in a small size.

A circuit card such as a memory card is provided by one embodiment of the present invention and includes a circuit module which includes a circuit component assembly and an electrical connector attached to the component assembly. A protective metal covering preferably of thin sheet metal such as stainless steel closely girds and substantially encloses the module in a one piece substantially rigid jacket, while an opening is provided in the jacket to expose a part of the electrical connector so the card may be connected to external equipment such as a computer. Advantageously the circuit module can be constructed with a perimeter frame, constructed from a suitable material such as plastic, which carries a circuit board, electronic or memory components, advantageously including IC's, and an electrical connector. In a preferred embodiment recesses are provided in the frame for locating the metal covering on the frame white projecting edges or corners of the frame provide concealment for jacket edges and provide impact absorbing corners for the card. No adhesives are necessary to bond the jacket to the frame or other components of the card.

BRIEF DESCRIPTION OF THE DRAWINGS

An example of one embodiment of the invention will now be described with reference to the accompanying drawings in which:

FIG. 1 composed of FIGS. 1a and 1b provides perspective views of an assembled memory card.

FIG. 2 composed of FIGS. 2a, 2b, 2c provides perspective view of components of a memory card.

DESCRIPTION OF THE PREFERRED EMBODIMENT

A preferred embodiment of the invention is incorporated into a rectangular memory card which is depicted in the drawings.

Figure 1A:
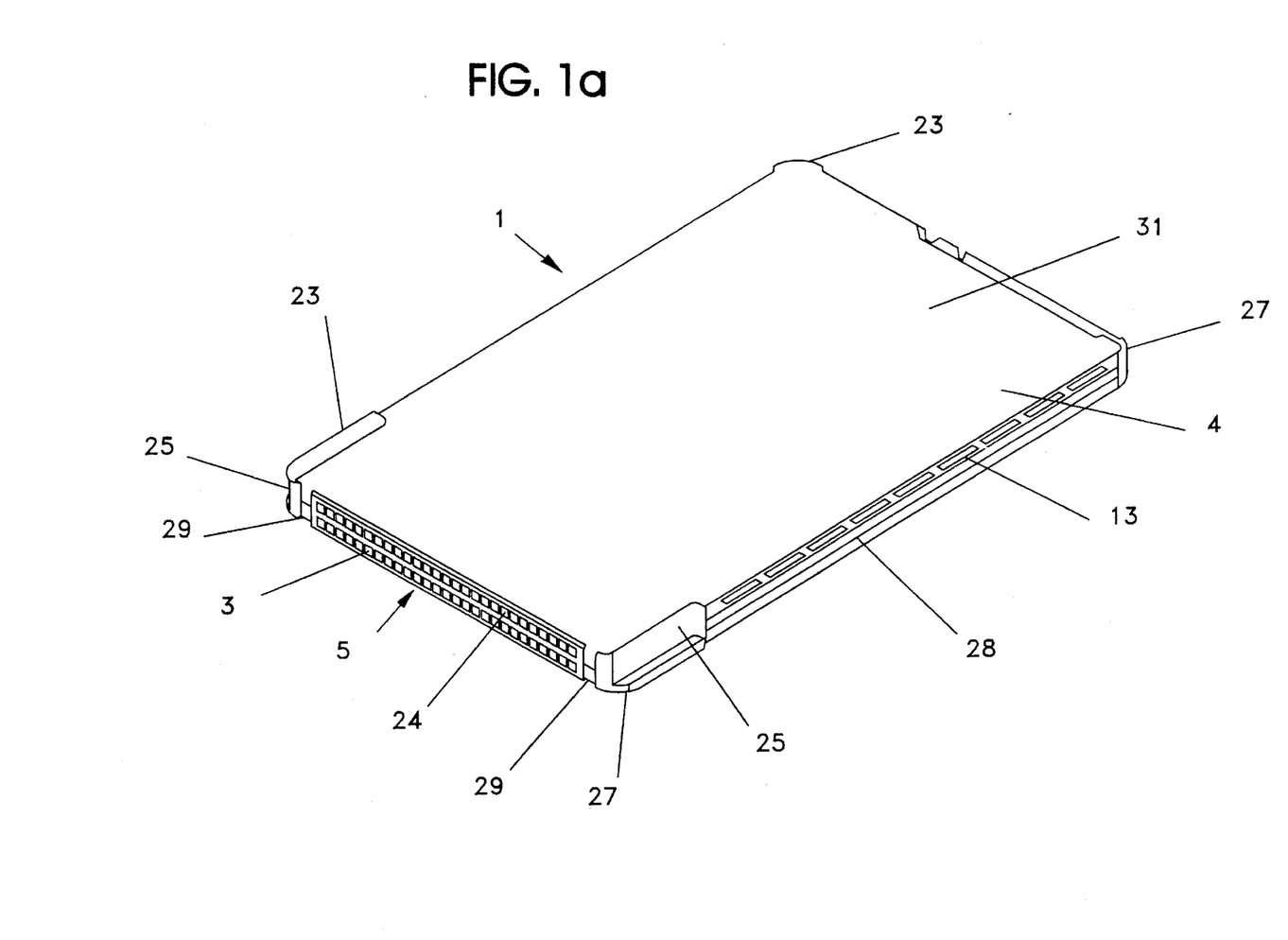
Figure 1B:
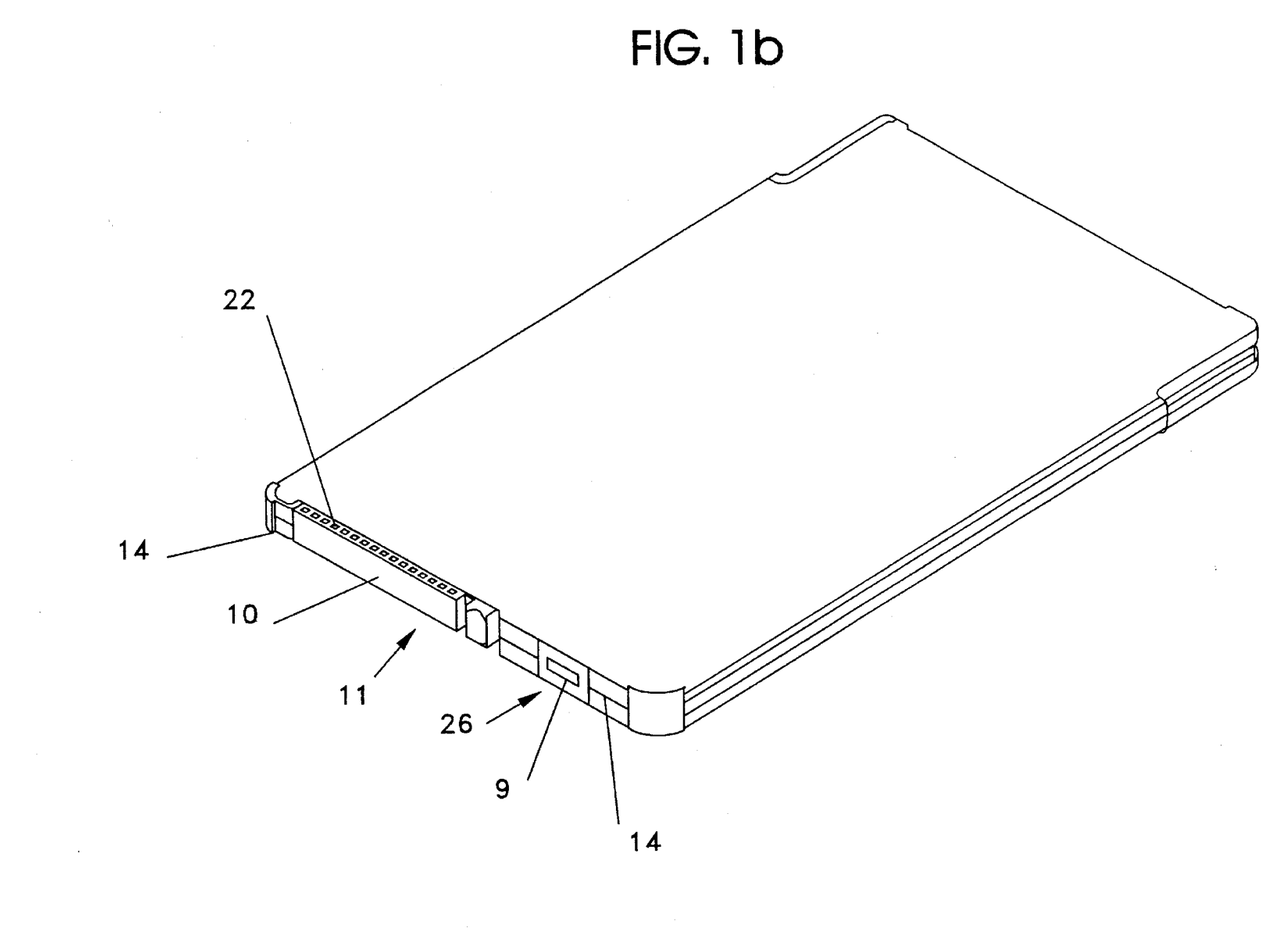

Referring to FIG. 1, memory card 1 is approximately the size of a credit card although somewhat thicker, the length and width being 85.6 mm and 54.0 mm respectively, with a thickness of approximately 3.3 mm conforming to the size specifications outlined by the Personal Computer Memory Card International Association (PCMCIA) for PC memory cards in the September 1991, issue PCMCIA PC Card Standard Release 2.0, which is available from the association.

These memory cards are designed to be used in personal computers or other devices with suitable sockets as an alternative to disk drives and floppy disks.

The difficulties with designing cards in this size include the meeting of the PCMCIA requirements for resistance to torque, bending, flexing and warpage to ensure longevity and reliability, requirements for protection from impact damage, and damage from static electricity.

The embodiment of the invention described herein satisfies these requirements.

Figure 2A:
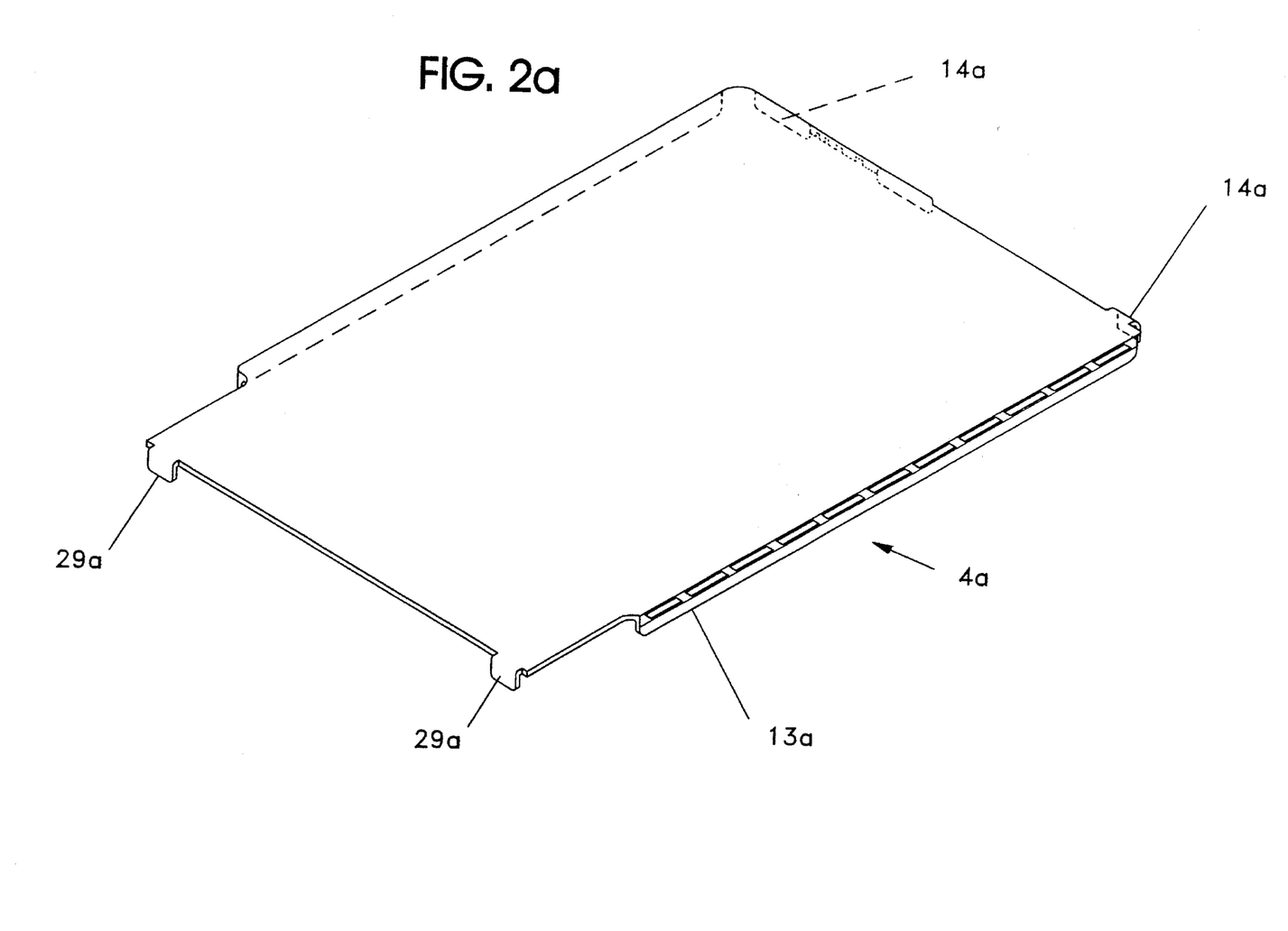
Figure 2B:
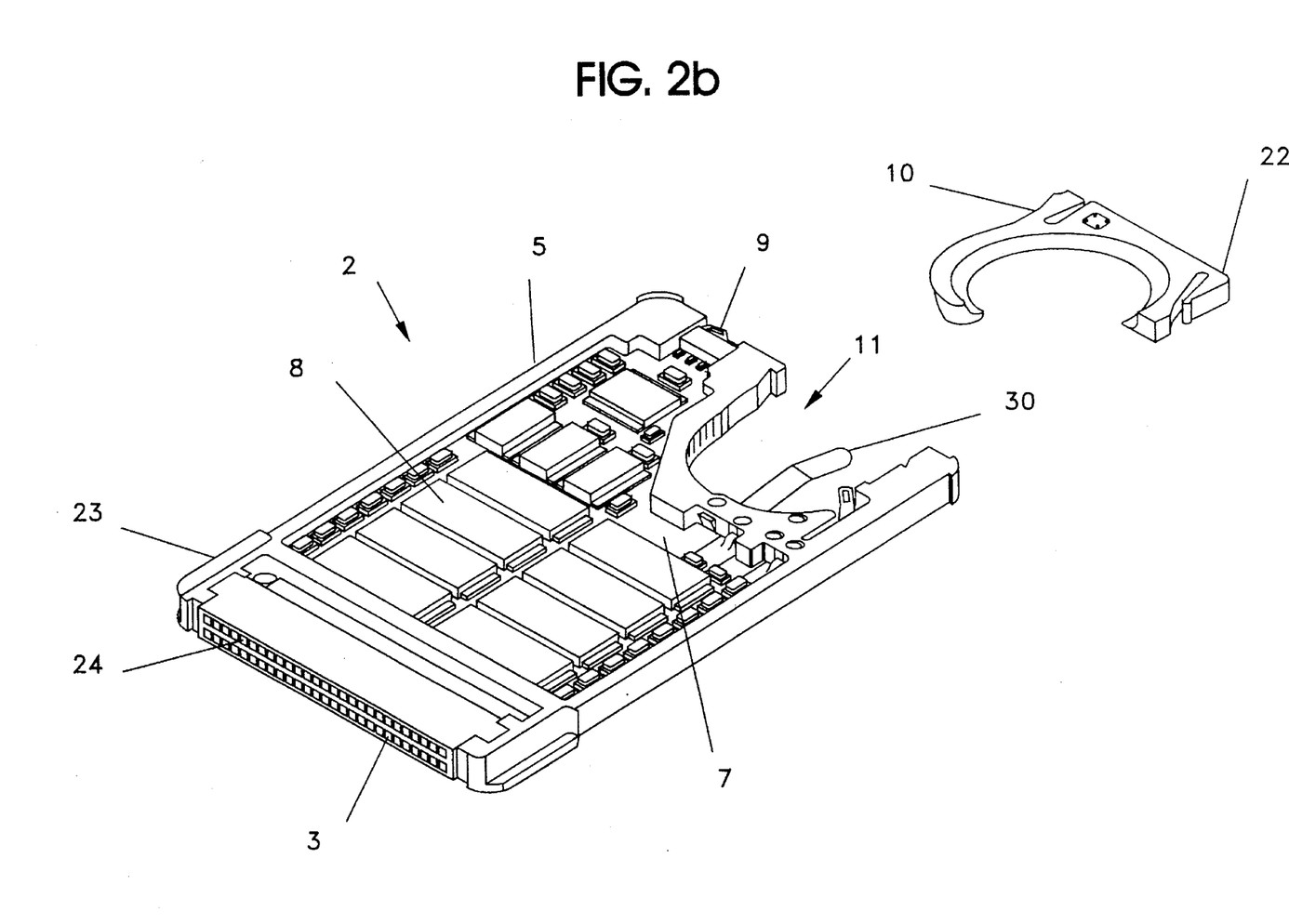
Figure 2C:
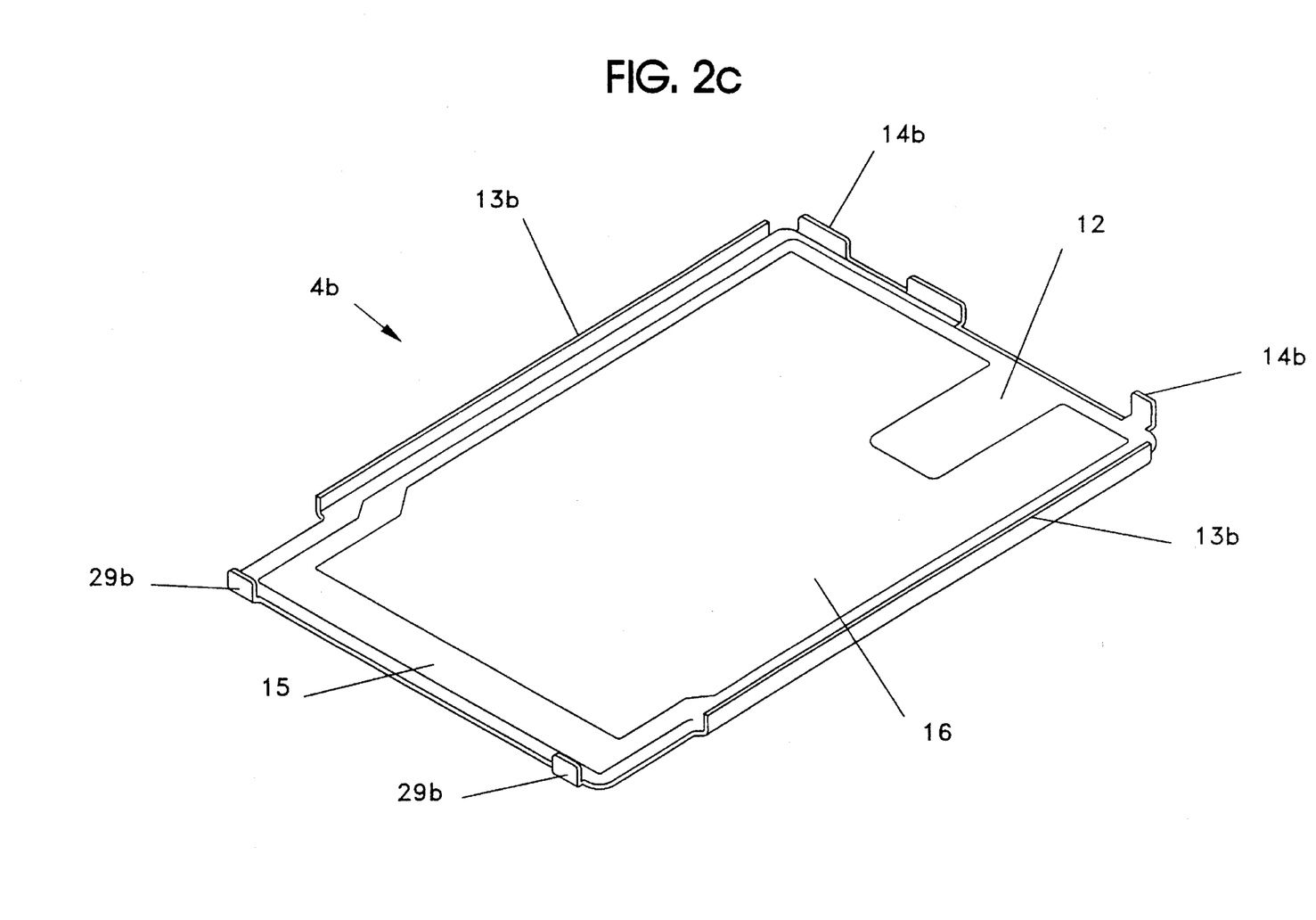

Referring to FIG. 1 and FIG. 2, memory card 1 is comprised of a circuit module 2 which includes integrated circuits or electronic components (not shown) and an electrical connector 3 connected to the electronic components. A protective metal covering, in this case of 304L stainless steel sheeting 0.2 mm thick, closely girds and substantially encloses the electronic module 2 in a close fitting one-piece substantially rigid jacket 4, having a top surface 31, bottom surface (not shown) and vertical sidewalls 13.

In the embodiment shown jacket 4 includes an opening 5 which exposes part of the electrical connector 3 so that the card 1 can be connected by means of a suitable socket to a personal computer or other external equipment.

Jacket 4 provides substantial protection for internal components of module 2 from physical damage and also provides electrical shielding of any sensitive internal components from external static electricity.

Physical protection of the circuit module 2 is achieved from the resistance of the metal jacket 4 to external penetration and from the rigidity of the jacket, which when constructed in rectangular configuration as shown, essentially forms a flattened hollow beam, ie. a boxbeam which resists bending, flexing and twisting of the card 1 and circuit module 2 more effectively than other means known to the applicant.

Referring to FIG. 2, component details of one embodiment of a memory card are shown. Circuit module 2 is composed of a perimeter frame 6, which advantageously may be constructed of a suitable plastic such as glass filled polycarbonate, eg. LEXAN 500™, which carries a circuit board 7 and electrical connector 3. In the case of the memory card shown, electronic components 8 advantageously include read-only storage modules for storage of operational programs or data, and read-write storage modules for use by the external equipment or computer to which the card may be connected from time to time. A write enable switch 9 connected to appropriate write enable circuitry is disposed at the rear end of the frame for user operation to enable alteration of contents of the read-write storage.

Battery holder 10 is adapted to hold a suitable coin style battery such as BR2325 and is removably insertable into battery receptor opening 11 in frame 6 for contact with electrical contacts, eg. contact 30. The battery is used to energize circuitry in the electronic module to retain information stored in the read-write storage when the memory card 1 is not in operation.

Upper cover 4a, and lower cover 4b, are assembled about the circuit module to form jacket 4 as described below. The covers take the general form of flat based rectangular dishes with bent edges forming perimeter walls. The covers shown are essentially mirror versions of each other. Referring to the bottom cover 4b, it may be seen LEXAN 500 is a trade mark of General Electric that it has a flat base 12 and upstanding walls 13b along its sides, walls 14b at the rear end and 29b at the connector end. Walls 14b are abbreviated to allow the formation of apertures on assembly for electrical connector 3, battery holder 10, and write protect switch 9 (aperture 26).

A portion of the base of each cover is narrowed to form a plate-like extension 15, for protecting connector 3. An insulating layer 16 illustrated may be advantageously incorporated on the interior of each cover to protect internal components.

Figure 3:
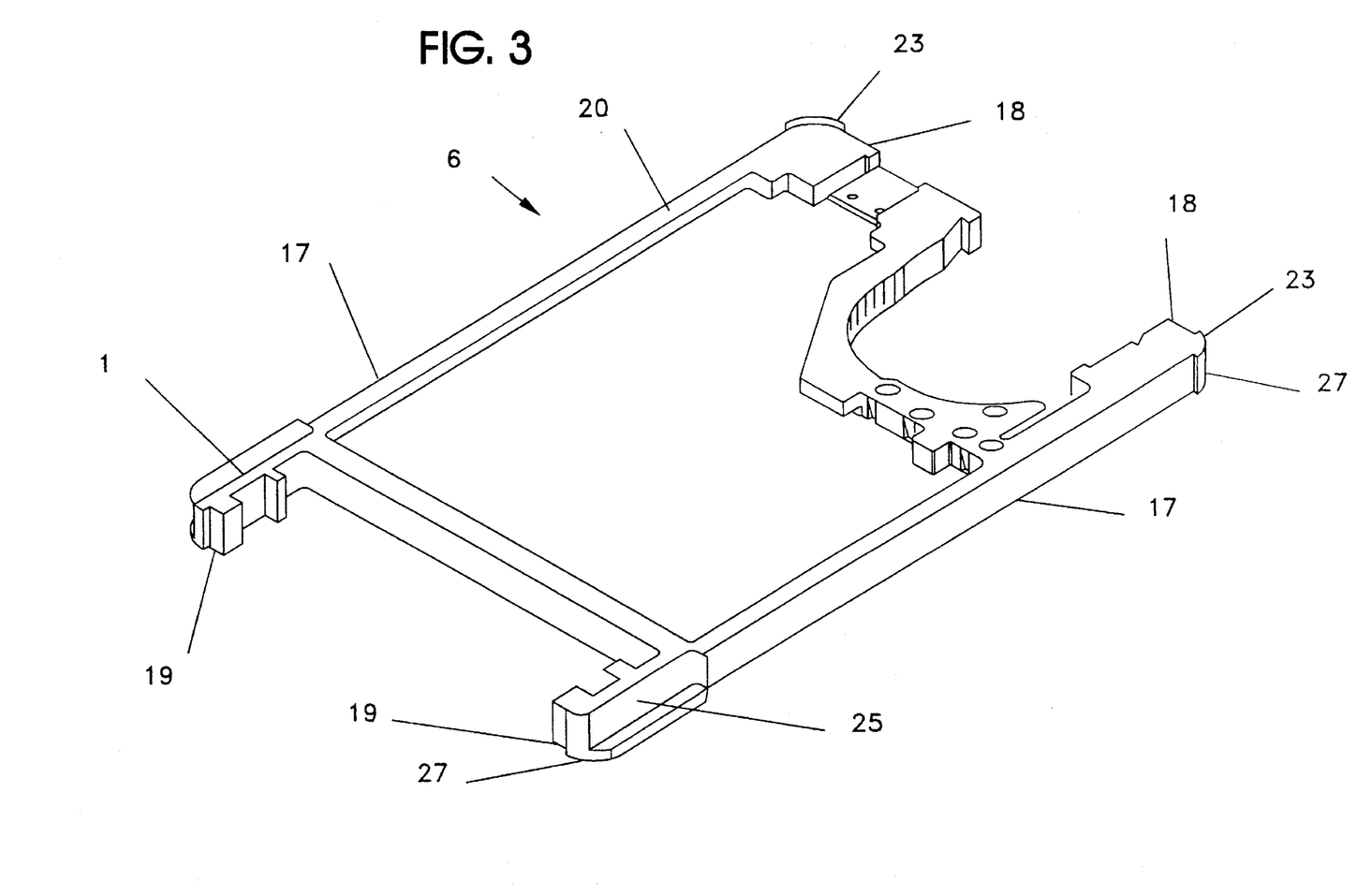
FIG. 3 is a perspective of a perimeter frame of a memory card.

The perimeter frame 6, which is shown in more detail in FIG. 3, has a number of functions and features. It functions as a carrier for circuit board 7 during the final stages of assembly and testing of the card. It importantly also functions as an internal arbor for locating covers 4a, 4b during assembly to control their alignment for the joining of the covers together. Recessed portions 17 along the sides of the frame, recesses 18 at the rear end of the frame and recesses 19 at the front (connector end) of the frame provide this alignment function.

In addition, the top (and likewise the bottom) surface 20 of the frame is recessed below protective edges or curb portions 21 and 23 of the edges of the frame. These curbs provide two functions. Curb portions 21 (along the sides of the frame adjacent the position that will be occupied by connector 3), curb portion 22 (at the rear end of the battery holder) (see FIG. 2), and similar curb 24 extending along the outer end of connector 3 (see FIG. 2) serve to conceal the unbent edges of covers 4a, 4b from exposure so that the covers can lay below or flush with these frame curbs. If the covers are set below the curbs a degree of protection will be given to artwork present on surfaces of the covers.

Corner curbs 23 of the perimeter frame conceal sharp corners of the cover while the frame corners 27 in general provide external shock absorbing material to reduce or prevent damage if the card is dropped. The corners also eliminate the need to draw the corners of the covers during their forming stage greatly reducing cost. The covers can therefore be produced by simple cutting and bending techniques that are well known.

Figure 4:
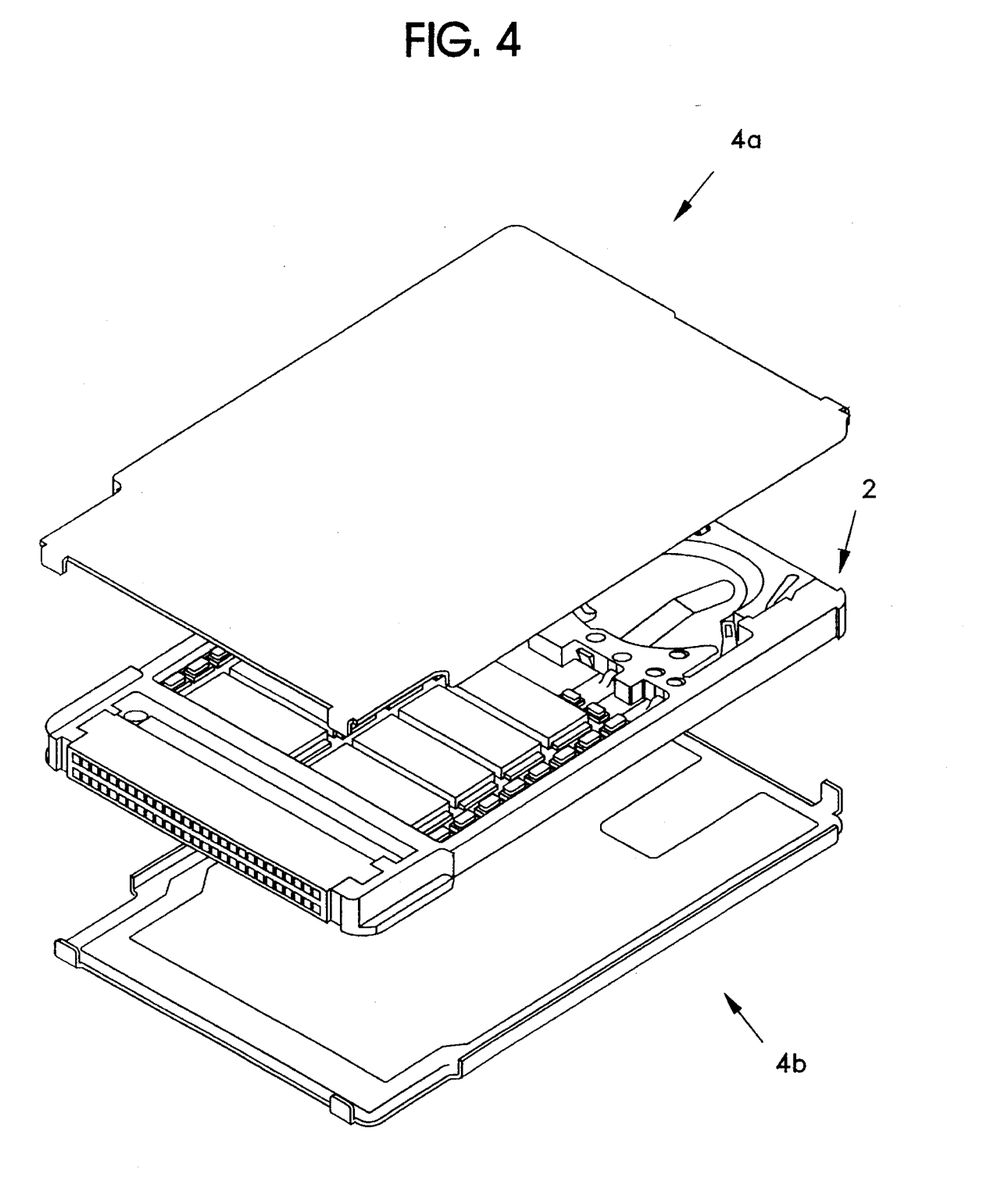
FIG. 4 is a perspective view of components of a memory card in proximity to each other.

FIG. 4 shows the covers and circuit module in proximity to each other for viewing convenience.

One process that has been found successful for the assembly of a memory card 1 in accordance with the invention herein using components referred to in FIGS. 2 and 3 is as follows:

1. A sub-assembly consisting of circuit board 7, write protect switch 9 and connector 3 is placed inside the bottom stainless steel cover 4b. The walls 13b, 14b, 29b of the cover extend upwards only half the thickness of the final assembly leaving the upper half of the sub-assembly exposed.

2. The top stainless steel cover 4a is placed over the remaining exposed sub-assembly, its walls 13a, 14a, and 29a resting on the corresponding upstanding walls 13b, 14b, and 29b of the lower cover.

3. This assembly is then placed inside a laser welding fixture which provides a limited clamping force so that the edges of both top and bottom cover remain touching. This fixture also advantageously provides a horizontal rotary action so that all four sides of the assembly can be exposed to a beam from a suitable laser for welding.

4. The laser beam is then activated to weld the edges of the covers on one side. Welds are done under a covering blanket of Argon gas. When the side is done the fixture is rotated and the next side is welded. When all sides are completed the finished welded card 1 is removed.

Laser welding is particularly suitable for joining the covers as the welding beam can be accurately controlled in energy level, pulse rate, beam size; and depth can be accurately maintained to provide a homogeneous joint 28 without penetrating beyond the stainless steel cover thickness, thus preventing damage to the plastic frame while achieving complete fusion of all abutting wall edges.

As laser welding and apparatus for achieving it are well known no additional details will be provided for the welding process or apparatus.

The welding operation produces a one-piece sheet metal jacket of substantial rigidity which girds the frame and protects its internal components.

While laser welding has been found suitable for the stainless steel described above, other joining techniques capable of producing strong continuous or homogeneous fusion such as brazing may be satisfactory depending on the materials selected.

In the rectangular form depicted the jacket essentially takes the shape of a flattened boxbeam.

Referring to FIG. 1 it can be seen that upper and lower portions of the jacket extend as plates 15 to cover opposite sides of the connector. The ends of the extension plates 15 are joined together by straps 29 set in recesses of connector 3 to maintain the integrity and strength of the jacket and card.

As may be seen the extension plates are somewhat narrower than the rest of the jacket to allow for projection of portions of the perimeter frame in which polarization grooves 25 have been formed to assure correct insertion of the card in cooperative external equipment.

The embodiment described above provides a durable memory card that can be assembled without adhesive being required on the frame or component parts to acquire strength. This has the advantage of reducing the stresses that can be exerted on the circuit board or its components which could otherwise contribute to deterioration of electrical joints and components. In addition, as no adhesive is present, the effect of heat and humidity on adhesive do not become limiting factors on card durability.

It will be appreciated that other variations of the above embodiments are included in the invention herein.

While the preferred embodiment of the invention described is a memory card, other types of circuit cards of differing sizes are contemplated by the invention herein.

What is claimed is:

1. A rectangular parallelopiped memory card having dimensions of thickness, width and length and comprising:

(a) a circuit module having:

(i) a perimeter frame of shock absorbing plastic material, (ii) a circuit board carried by said perimeter frame and including memory means, and (iii) an electrical connector disposed at one end of said frame and electrically connected to said circuit board;

(b) a one-piece, substantially rigid, protective metal jacket covering closely girding said perimeter frame and substantially enclosing said circuit module;

said perimeter frame defining (i) recessed portions for locating said jacket covering, (ii) protective edge portions for concealing edges of said jacket covering from exposure, and (iii) exposed protective corner buffer portions for absorbing physical shock; said jacket covering defining an opening spanning the thickness and width of said memory card at one end thereof for exposing a portion of said electrical connector for connection to external equipment.

* * * * *